United States Patent [19]

Murray et al.

[11] Patent Number: 5,064,663
[45] Date of Patent: Nov. 12, 1991

[54] SODIUM CHLORIDE SUBSTITUTE CONTAINING AUTOLYZED YEAST AND AMMONIUM CHLORIDE

[75] Inventors: Daniel G. Murray, Naperville; John R. Shackelford, LaGrange, both of Ill.

[73] Assignee: Burns Philp Food, Inc., San Francisco, Calif.

[21] Appl. No.: 449,248

[22] Filed: Dec. 7, 1989

Related U.S. Application Data

[63] Continuation of Ser. No. 831,241, Feb. 19, 1986, abandoned, which is a continuation of Ser. No. 661,112, Oct. 15, 1984, abandoned, which is a continuation of Ser. No. 410,263, Aug. 23, 1982, abandoned.

[51] Int. Cl.$^5$ .................. A23L 1/28; A23L 1/237; C12P 3/00; C12P 1/02
[52] U.S. Cl. .................... 426/60; 426/649; 426/804; 426/806; 435/41; 435/168; 435/171
[58] Field of Search ............ 426/60, 62, 649, 804, 426/806; 435/255, 256, 41, 168, 171

[56] References Cited

U.S. PATENT DOCUMENTS

| | | | |
|---|---|---|---|
| 2,471,144 | 12/1948 | Davy | 426/649 |
| 2,601,112 | 3/1950 | Freedman | 426/806 X |
| 3,505,082 | 4/1970 | Miller | 426/806 X |
| 3,514,296 | 1/1971 | Frank et al. | 426/649 |
| 3,775,543 | 11/1973 | Zyss | 426/804 X |
| 3,860,732 | 1/1975 | Eisenstadt | 426/649 |
| 4,297,375 | 10/1981 | Shackelford | 426/62 |

FOREIGN PATENT DOCUMENTS

| | | | |
|---|---|---|---|
| 2511850 | 9/1975 | Fed. Rep. of Germany | 426/62 |
| 0799707 | 2/1981 | U.S.S.R. | 426/62 |

OTHER PUBLICATIONS

Rose et al., The Yeasts, vol. 3, Academic Press, N.Y., 1970, pp. 372-373.

*Primary Examiner*—David M. Naff
*Attorney, Agent, or Firm*—Pillsbury Madison & Sutro

[57] ABSTRACT

A sodium chloride substitute composition having low bitterness and an intense sodium chloride flavor is prepared containing autolyzed yeast, ammonium chloride and optionally potassium chloride. The composition is prepared preferably by a method wherein yeast, an exogenous enzyme, ammonium chloride, optionally potassium chloride and liquid are mixed to form a liquid mixture, the mixture is stirred at an elevated temperature until the yeast is autolyzed, and the mixture is dried. The composition contains an amount of autolyzed yeast relative to the amount of ammonium chloride in the range of about 60 to 95 percent by weight. The composition is suitable for use in processed meats and snack foods.

6 Claims, No Drawings

SODIUM CHLORIDE SUBSTITUTE CONTAINING AUTOLYZED YEAST AND AMMONIUM CHLORIDE

This application is a continuation of application Ser. No. 831,241, filed Feb. 19, 1986, which is a continuation of Ser. No. 661,112, filed Oct. 15, 1984, which is a continuation of Ser. No. 410,263, filed Aug. 23, 1982 all now abandoned.

This invention relates to a sodium chloride substitute flavoring system comprising autolyzed yeast and ammonium chloride which improves the saltiness of foods, reduces the bitterness of sodium chloride substitutes and is suitable for use in a sodium chloride substitute system for processed meats and snack foods. More particularly, this invention relates to a sodium chloride substitute flavoring system comprising autolyzed yeast, ammonium chloride and potassium chloride and the use of the system in the preparation of a low sodium frankfurter.

The use of sodium salt, namely sodium chloride, has long been suspected as a cause of health problems, particularly hypertension. Although a cause-effect relationship between excessive sodium ingestion and hypertension has apparently not been established, it is known that a reduction of sodium intake alone will accomplish a reduction in the hypertensive state.

With growing consumer awareness and a more active presence by the FDA in the labelling requirements for the use of sodium salts, private industry is now concerned with the amount of sodium chloride they are adding to their food products. Presently many food product manufacturers are adding sodium chloride directly to their food system. In addition, a large percentage of the purchased ingredients used in formulating food products also contains sodium chloride. In some instances, the sodium chloride content can be as high as 50% by weight on a dry solids basis of the food ingredient. (Hereinafter all references to weight, percent by weight or parts by weight will be on a dry solids basis unless otherwise indicated.)

To some degree the problem of high sodium levels in foods can be reduced by simply lowering the level of sodium chloride added to the food product formulations. But unfortunately the level of sodium chloride in most cases cannot be lowered due to preservation requirements and the necessity of from 0.5% to 2.5% by weight of sodium chloride in the food product for flavor requirements.

To effect a reduction in sodium chloride or the sodium ion, many food processors have employed potassium chloride as a sodium chloride substitute. However, potassium chloride is easily discernable from sodium chloride, or table salt, by most humans. In some societies the flavor of potassium chloride is readily accepted, but in the United States, Europe, and Asia the flavor is unacceptable. Although potassium chloride is perceived as being salty, the potassium ion imparts an "off" flavor most often described as bitter. The reason for bitterness perception with potassium salt and not with sodium salt is not generally understood, but the perceptor sites located on the tongue where saltiness is perceived can readily distinguish potassium from sodium and this difference is physiologically perceived as a difference in bitterness intensity. Because of the difference in flavor between potassium chloride and sodium chloride, it is necessary to employ additives in sodium chloride substitutes to minimize this flavor difference.

For example, U.S. Pat. No. 3,860,732 (Eisenstadt) discloses a sodium chloride substitute having reduced bitterness containing potassium chloride, or potassium chloride and ammonium chloride, in admixture with lactose or dextrose or both and cream of tartar.

U.S. Pat. No. 4,066,799 (Cornelius et al.) discloses a sodium chloride substitute containing a glycinamide salt in mixture with a flavor potentiator such as glutamic acid, monosodium glutamate, etc.

U.S. Pat. No. 3,782,974 (Lontz et al.) discloses a sodium chloride substitute formulation containing defined proportions of ascorbic acid, fumaric acid, and citric acid.

U.S. Pat. No. 3,505,082 (Miller) discloses a sodium chloride substitute comprising potassium chloride and a minor proportion of fumaric acid.

Commonly assigned U.S. Pat. No. 4,297,375 (Shackelford) discloses a sodium salt substitute having reduced bitterness containing autolyzed yeast and potassium chloride.

Although Shackelford has made substantial advances towards solving the problem of the bitterness associated with the use of potassium chloride, the problem of salt flavor intensity still exists. Potassium chloride has less salt flavor intensity than sodium chloride. Generally, increasing the amount of potassium chloride to match the salt flavor intensity of sodium chloride is not a solution to this problem because the bitter flavor also increases. Shackelford discloses that the amount of yeast necessary to effectively reduce the bitter flavor of the potassium chloride varies greatly from one food system to another. The amount of autolyzed yeast relative to the amount of potassium chloride can exceed 300% by weight. Therefore, in several food systems the use of this salt substitute is limited because a yeasty flavor is detected by some people before the desired salt intensity is achieved. The loss in salt flavor intensity due to the use of potassium chloride needs to be compensated for.

Other chloride salts, such as calcium chloride, magnesium chloride, lithium chloride and ammonium chloride have also been suggested as possible substitutes for sodium chloride. As with potassium chloride, potential use of these salts is restricted by unacceptable flavor. Commercial use of the sodium chloride substitutes is further restricted to those substances having FDA approval. Presently, potassium chloride and ammonium chloride are both recognized as safe. Eisenstadt alleges that commercial sodium chloride substitutes generally contain potassium chloride or mixtures of potassium chloride and ammonium chloride. The ammonium chloride gives a stronger, less acceptable, flavor when used alone; but, when added to potassium chloride, can result in a saltier flavor than potassium chloride alone. Use of the mixture is still limited, because unacceptable flavor results before desired salt intensity is achieved.

In the processed meat industry, sodium chloride performs more than just a flavoring function. It is a principal ingredient for purposes of preservation and texturization. High sodium chloride concentrations inhibit bacterial growth. Sodium chloride concentration also effects the water-holding capacity and emulsifying properties of meat protein. It plays a key role in the formation of stable emulsions which directly effect the texture of processed meats. Several recent studies have concluded that sodium chloride replacement in processed meat products by conventional sodium chloride substitutes is limited due to undesirable effects on flavor, texture, and bacterial growth rate. For example, D. G. Olson and R. N. Terrell stated in "Sensory Properties of Processed Meats Using Various Sodium Salt Substitutes" presented at the 1981 Meat Industry Research Conference, Mar. 26-28, Am. Meat Inst., Arlington, Va., that partial replacement of sodium chloride with potassium chloride, an accepted salt substitute, must not exceed 50% because of significant increases in the bitterness of the product. D. L. Seman, D. G. Olson and R. W. Mandigo have found that in order to form stable emulsions, replacement of sodium chloride with potassium chloride is limited to one half of the normal level of sodium chloride. "Effect of Reduction and Partial Replacement of Sodium on Bologna Characteristics and Acceptability," *J. of Food Science*, 45, 1980, pp. 1116-1121. R. N. Terrell reports that when fifty percent of the normal level of sodium chloride in processed meat products is replaced with potassium chloride, a significant increase is seen in the growth of the bacteria lactobacillus, the common cause of acid-spoiled odors and flavors in processed meats. "Reduction or Replacement of Salt in Processed Meats" presented at the 24th Annual Meat Science Inst., Univ. of Georgia, Athens, Ga., Mar. 14-17, 1982. Therefore, there is a need for a sodium chloride substitute system capable of permitting reduction of sodium chloride content without producing undesirable effects on flavor, texture, and bacterial growth.

The general object of this invention is to provide a sodium chloride substitute flavoring system which imparts enhanced salt flavor intensity to foods without adding any significant quantity of sodium to the foods, while reducing the bitterness of sodium chloride substitutes. Another object of this invention is to provide a sodium chloride substitute system which has an enhanced salt flavor intensity and reduced bitterness. Another object of this invention is to provide a sodium chloride substitute system for use in processed meat products which has suitable preservation and texturing properties.

Other objects and advantages of the present invention will be apparent from a further reading of the specification and of the appended claims.

We have found that combining autolyzed yeast with ammonium chloride results in a sodium chloride substitute flavoring system which, surprisingly, enhances salt flavor intensity. The system both reduces the bitterness of, and enhances the saltiness of, potassium chloride, and, when incorporated into processed meats, aids in solubilization of proteins and texturization, and effectively suppresses bacterial growth. In a preferred embodiment, the ammonium chloride is co-processed with autolyzed yeast. Co-processing ammonium chloride and autolyzed yeast requires that the two elements are combined in the presence of a liquid, preferably water, and then dried. The advantage to co-processing ammonium chloride with the autolyzed yeast is the close proximation of the active ingredients which further enhances the salt flavor intensity and reduces the bitterness of the sodium chloride substitute.

The autolyzed yeast useful in the various aspects of this invention can be prepared in the conventional manner well known in the art. In particular, a slurry or cream of active yeast cells (5-30 weight percent solids) can be plasmolyzed with up to 6 weight percent sodium chloride (based on cell dry weight). Ethyl acetate can be added as an antiseptic at 1% by volume to prevent bacterial growth. The slurry can be heated to 30°-60° C. and held at that temperature for about 10-50 hours, or until the desired degree of solubilization is achieved. The resulting autolyzed yeast can then be pasteurized, centrifuged, and dried to a powdery product.

A preferred yeast autolyzate can be prepared in the conventional manner as set forth above, but with the addition of an exogenous enzyme such as papain, ficin, bromelain, pancreatin, or aspergillus protease to assist in the yeast cell digestion. U.S. Pat. No. 4,218,481 to Chao et al., incorporated by reference, discloses an autolysis process in which exogenous enzymes are added to the yeast slurry in concentrations of from 0.01 to 1.0 percent by weight, resulting in a shorter digestion time. Accordingly, for purposes herein, the term "autolyzed yeast" includes such autolyzed yeasts produced with the aid of exogenous enzymes.

The source of yeast can be chosen from several yeast species. *Candida utilis, Saccharomyces cerevisiae, Saccharomyces carlsbergensis, Saccharomyces uvarum, Kluyveromyces fragilis* and *Candida lipolytica* are preferred yeasts because of their current acceptance for food uses.

Co-processing the ammonium chloride with the autolyzed yeast can be achieved by several means. The ammonium chloride can be added as a salt or formed by adding an ammonium compound and then adding hydrochloric acid to form the ammonium salt. The salt can be added to the yeast at any of several stages during the autolysis process. It can be added to the slurry or cream of active cells; it can be added during plasmolysis; or it can be added just prior to pasteurization or drying. Autolyzed yeast which has already been dried may be resuspended in an aqueous medium and the salt may then be added. In the preferred embodiment, ammonium chloride is added directly to the slurry or cream of active cells so that it can aid in plasmolysis of the cells. Co-processing the ammonium chloride and autolyzed yeast results in increased salt flavor intensity and reduced yeast flavor intensity when compared to simple combinations of the two components. In salt substitute systems using ammonium chloride, potassium chloride and autolyzed yeast, potassium chloride can also be co-processed with the other two components in the manner described above. Co-processing of the ammonium chloride alone with the autolyzed yeast is preferred, however, as it maximizes the salt flavor intensity.

The ratio of autolyzed yeast to ammonium chloride in the sodium chloride substitute flavoring system is dependent upon the food system. Generally, however, the amount of autolyzed yeast relative to the amount of ammonium chloride is in the range from about 95 percent to greater than 60 percent by weight. Ratios of autolyzed yeast relative to ammonium chloride greater than 95% result in less salt flavor intensity with increasing yeasty flavor whereas ratios lower than 60% have too strong of an ammonium chloride flavor and tend to leave a bitter aftertaste. The preferred ratio of autolyzed yeast to ammonium chloride in a basic flavoring system is about four parts to about one part by weight. Preferred amounts for each food system can be readily determined without undue experimentation.

The amount of the sodium chloride substitute flavoring system utilized also varies according to the particular food system in which it is being used. When the flavoring system is used in conjunction with potassium chloride, routine experimentation will determine the quantity of the additive which is necessary to disguise the bitterness of the potassium chloride while providing the desired salt flavor intensity. The ratio of the components in the salt substitute system can range from 0.5 to 20 parts by weight potassium chloride to one part by weight co-processed autolyzed yeast and ammonium chloride (20%). Smaller ratios result in a very salty flavor which has harsh flavor notes from the ammonium chloride. When larger ratios are used the bitterness of potassium chloride becomes a problem. A more preferable range is from 0.75 to 11.0 parts by weight potassium chloride to one part by weight co-processed autolyzed yeast and ammonium chloride (20%). The preferred ratio for a basic sodium chloride substitute is 2.25 parts potassium chloride to one part co-processed autolyzed yeast and ammonium chloride (20%).

In processed meat products, the sodium chloride substitute flavoring system can be used in conjunction with potassium chloride to replace up to two-thirds of the sodium chloride while maintaining acceptable flavors, texture and low bacterial growth. A preferred formula replaces one-half of the sodium chloride with potassium chloride, co-processed autolyzed yeast and potassium chloride (32%), and co-processed autolyzed yeast and ammonium chloride (20%) in a ratio of 3.33 parts to 5 parts to one part by weight.

The following examples are given to further illustrate the present invention. The scope of the invention is not, however, meant to be limited to the specific details of the examples.

EXAMPLE I

Twenty-three lbs. of yeast cream (*Candida utilis*) containing 19.75% solids on a dry weight basis were heated in a 30 gallon jacketed tank to 130° F. To this were added 4.1 grams of crude papain. The mixture was stirred for 20 hours while maintaining the temperature at 130° F. to allow autolysis. 1.14 lbs. of ammonium chloride were added and thoroughly mixed. The mixture was brought to a temperature of 170° F. for pasteurization and then drum dried under 85 lbs. of steam pressure. The resultant product was a free-flowing granular material with saltiness and less than 0.08 percent by weight sodium. Tests were performed on this co-processed blend of autolyzed yeast and ammonium chloride in Examples IV through X below.

EXAMPLE II

Twenty-three lbs. of yeast cream (*Candida utilis*) containing 19.75% solids on a dry weight basis and 1.14 lbs. of ammonium chloride were heated in a 30 gallon jacketed tank to 130° F. To this were added 4.1 grams of crude papain. The mixture was stirred and held for 16 hours at 130° F. to allow autolysis of the yeast. The mixture was then pasteurized at 170° F. and drum dried under 85 lbs. of steam pressure.

EXAMPLE III

A commercially available salt substitute, ZYEST-45®, is prepared in the following manner: A yeast cream (*Candida utilis*) containing 19.75% solids on a dry weight basis is heated to 130° F. and 0.2% by weight of crude papain is added. The mixture is stirred and held at a constant temperature for 20 hours to allow autolysis. Potassium chloride is added to the mixture in amounts equal to 32% on a dry weight basis. The mixture is thoroughly mixed, pasteurized for two minutes at 175° F., and then drum dried under 80 lbs. of steam pressure to form sheets. The sheets are then milled to produce the final product.

EXAMPLE IV

Chicken broth was prepared by bringing to a boil 90 parts of water. To the boiling water was added 10 parts of mechanically deboned chicken meat. The blend was filtered to remove unsoluble chicken meat.

The following blends were prepared (quantities represent parts by weight):

|  | A* | B** |
|---|---|---|
| Broth | 100.00 | 100.00 |
| Autolyzed Yeast | 0.61 | 0.75 |
| Total Chlorides | 0.093 | 0.093 |

*Co-processed blend of autolyzed yeast and potassium chloride of Example III
**Co-processed blend of autolyzed yeast and ammonium chloride of Example I Levels of A and B were adjusted for equal Total Chlorides. Three trained panelists were asked to compare A and B; then, to add chicken broth to the sample with the most salt flavor intensity until both samples were equal.

| | Salt Flavor Intensity | |
|---|---|---|
| | A | B |
| Total Chlorides | 0.093 | 0.093 |
| Flavor Intensity | 1.000 | 1.750 |

B contributes the most salt flavor intensity as shown above. Based on these results, it can be seen that the combination of ammonium chloride and autolyzed yeast versus potassium chloride and autolyzed yeast has more salt flavor intensity.

EXAMPLE V

The following examples illustrate the benefit derived from co-processing the ammonium chloride with the autolyzed yeast.

Chicken broth was prepared as in Example IV. Three blends were prepared and a sensory analysis for salt intensity, bitterness and yeasty flavor completed. The blends were formulated as follows (quantities represent parts by weight):

|  | 1 | 2 | 3 |
|---|---|---|---|
| Chicken Broth | 100.0 | 100.0 | 100.0 |
| Autolyzed Yeast | 0.8 | — | — |
| Ammonium Chloride | 0.2 | — | 0.2 |
| Co-processed Ammonium Chloride and Autolyzed Yeast | — | 1.0 | — |

Three trained panelists completed the sensory analysis. Results were:

|  | 1 | 2 | 3 |
|---|---|---|---|
| Bitterness Intensity | Low | Low | Medium |
| Salt Intensity | Medium | High | Low |
| Yeast Flavor Intensity | Medium | Low | None |

Autolyzed yeast reduced the bitterness or harsh flavor from ammonium chloride. Co-processing the ammonium chloride and autolyzed yeast resulted in:
1. more salt flavor intensity, and
2. reduced yeast flavor intensity.

EXAMPLE VI

A chicken broth was prepared as shown in Example IV.

The broth was blended as follows (quantities represent parts by weight):

|  | 1 | 2 | 3 |
|---|---|---|---|
| Chicken Broth | 100.0 | 100.0 | 100.0 |
| Potassium Chloride | 1.0 | 1.0 | 1.0 |
| Ammonium Chloride | — | 0.2 | — |
| Autolyzed Yeast | — | 0.8 | — |
| Co-processed Autolyzed Yeast and Ammonium Chloride | — | — | 1.0 |

Three trained panelists were asked to complete a sensory test:

|  | 1 | 2 | 3 |
|---|---|---|---|
| Bitterness Intensity | High | Medium | Low |
| Salt Flavor Intensity | Low | Medium | High |

The bitterness due to potassium chloride and ammonium chloride was shown to vary among the three examples. The bitterness was at the minimum where ammonium chloride and autolyzed yeast were co-processed. The presence of autolyzed yeast in Sample 2 did reduce bitterness, but this was not as effective as the conditions in Sample 3. The presence of ammonium chloride and autolyzed yeast does contribute to the salt experience over potassium chloride alone. However, this flavor enhancement is further increased by co-processing the autolyzed yeast and ammonium chloride together.

EXAMPLE VII

The following example illustrates the influence of co-processed autolyzed yeast and ammonium chloride on bitterness resulting from the use of potassium chloride.

A chicken broth was prepared as in Example III. Four blends were prepared (quantities represent parts by weight):

|  | 1 | 2 | 3 | 4 |
|---|---|---|---|---|
| Chicken Broth | 100.0 | 100.0 | 100.0 | 100.0 |
| Potassium Chloride | 1.0 | 1.0 | 2.0 | 2.25 |
| Ammonium Chloride | 0.2 | — | — | — |
| Co-processed Autolyzed Yeast and Ammonium Chloride (20%) | — | 1.0 | 1.0 | 1.0 |

Three trained panelists were asked to evaluate the four samples in terms of bitterness intensity. Initially, Samples 1 and 2 were presented to the panel who were asked which sample had more bitterness. The panel advised that Sample 1 was far more bitter than Sample 2. The three panelists were then asked to evaluate all four samples for bitterness. Samples 1 and 4 were felt to have equal bitterness. These results indicate that the bitterness flavor from potassium chloride can be stabilized even though potassium levels are increased.

EXAMPLE VIII

The following example illustrates the effect of the sodium chloride substitute system on flavor and texturizations of processed meats.

Frankfurters were prepared in the following manner using the formula in Table I and the salt concentrations shown in Table II.

1. The lean beef was ground through a ⅛" plate; the jowls through a ½" plate.
2. Meats, salt, water/ice, dissolved nitrite and remaining ingredients were chopped until the temperature reached 40° F.
3. The mixture was run twice through an emulsifier having a 1.0 mm plate. The initial emulsion temperature was 40° F. The final emulsion temperature ranged between 60°-62° F.
4. The mixture was stuffed into casings (Teepak, 25RP) and linked.
5. The links were exposed to the following smokehouse process:

| Fast Air Circulation | |
|---|---|
| 150° F. | 45 minutes |
| 160°/118° F. | 30 minutes |
| 170°/128° F. | 30 minutes |
| 170°/steam to 152° F. internal temperature | |
| Shower | |

6. Frankfurters were chilled and vacuum packaged.

TABLE I

| Frankfurter Formula | |
|---|---|
| Ingredients | Parts By Weight |
| Meat Block | |
| Lean Beef (15% Fat) | 56.0 |
| Pork Jowls (65% Fat) | 44.0 |
| | 100.0 |
| Water/Ice | 30.0 |
| Corn Syrup Solids | 2.0 |
| Dextrose | 1.0 |
| Liquid Frank Seasoning | .45 |
| Liquid Smoke | .125 |
| Garlic Powder | .016 |
| Sodium Erythorbate | .055 |
| Sodium Nitrite | .016 |

TABLE II

| Batch Number | Salt Concentrations Per 100 Parts Meat Block By Weight | |
|---|---|---|
| 1 | 2.5% | NaCl |
| 2 | 1.25% | NaCl |
|  | 1.25 | KCl |
| 3 | 1.25% | NaCl |
|  | 0.60 | KCl |
|  | 2.00 | Co-processed autolyzed yeast and (32%) KCl |
| 4 | 1.25% | NaCl |
|  | 1.00 | KCl |
|  | 0.65 | Co-processed autolyzed yeast and (32%) KCl |
|  | 0.35 | Co-processed autolyzed yeast and (20%) NH₄Cl |
| 5 | 1.25% | NaCl |
|  | 0.60 | KCl |
|  | 1.25 | Co-processed autolyzed yeast and (32%) KCl |
|  | 1.00 | Co-processed autolyzed yeast and (20%) NH₄Cl |

Fifteen frankfurters were skinned and boiled for five minutes. Flavor and texture were evaluated by four panelists:

| Batch Number | |
|---|---|
| 1 | Good flavor, slightly tart, firmer texture than Number 5. |
| 2 | Two panelists said good flavor, the other two said metallic flavor; aftertaste. |
| 3 | Yeasty flavor, bad-off flavor, less salty than Number 4. |
| 4 | Good salt flavor, good overall flavor. |
| 5 | Cardboard tasting, yeasty, soft texture; one said saltiness okay and another disagreed. |

The frankfurters with the most acceptable flavor were Number 4 (1.25 percent NaCl, 1.00 percent KCl, 0.65 percent co-processed autolyzed yeast and (32%) KCl, and 0.35 percent co-processed autolyzed yeast and (20%) $NH_4Cl$).

EXAMPLE IX

The following example illustrates the effect of the sodium chloride substitute system on microbial growth.

Frankfurters were prepared in the following manner using the frankfurter formula in Table III and the salt formulations in Table IV represented in terms of parts per 100 parts Meat Block by Weight.
1. The lean beef was ground through a ⅛" plate; the jowls and trim through a ½" plate.
2. Meats, salt, water/ice, dissolved nitrite and remaining ingredients were chopped until the temperature reached 45° F.
3. The mixture was run twice through an emulsifier having a 1.0 mm plate. The initial emulsion temperature was 45° F. The final emulsion temperature ranged between 64°-66° F.
4. The mixture was stuffed into casings (Union Carbide No Jax, 27 mm) and linked.
5. The links were exposed to the following smokehouse process:

| Fast Air Circulation | |
|---|---|
| 150° F. | 50 minutes |
| 160°/118° F. | 30 minutes |
| 170°/128° F. | 30 minutes |
| 170°/steam to 152° F. internal temperature | |
| Shower | |

6. The frankfurters were chilled and vacuum packaged.

TABLE III

| Frankfurter Formula | |
|---|---|
| Ingredients | Parts By Weight |
| Meat Block | |
| Lean Beef (19% Fat) | 52.2 |
| Pork Jowls (65% Fat) | 22.8 |
| Lean Pork Trim (15% Fat) | 25.0 |
| | 100.0 |
| Water/Ice | 30.0 |
| Corn Syrup Solids | 2.0 |
| Dextrose | 1.0 |
| Liquid Frank Seasoning | .45 |
| Liquid Smoke | .125 |
| Garlic Powder | .016 |
| Sodium Erythorbate | .055 |
| Sodium Nitrite | .016 |

TABLE IV

| | 1 | 2 | 3 | 4 | 5 |
|---|---|---|---|---|---|
| Sodium Chloride | 2.50 | — | 1.25 | 1.25 | 1.25 |
| Potassium Chloride | — | — | 1.00 | 0.85 | 0.95 |
| 50/50 mixture of Sodium Chloride & Potassium Chloride | — | 2.50 | — | — | — |
| Co-processed autolyzed yeast and 32 percent KCl | — | — | 0.65 | 0.75 | 0.65 |
| Co-processed autolyzed yeast and 20 percent $NH_4Cl$ | — | — | 0.35 | 0.40 | 0.40 |
| Autolyzed yeast | — | — | — | 0.20 | 0.30 |

Studies were performed by an independent research organization on relative microbial shelf life. The following results were observed.

| | TOTAL SURFACE COUNT/gm (35C) | | | |
|---|---|---|---|---|
| | WEEK 0 | WEEK 2 | WEEK 4 | WEEK 6 |
| FORMULATION 1 | 300 | 800 | 54,000,000 | 4,200,000 |
| FORMULATION 2 | 200 | 400 | 50,000 | 3,400,000 |
| FORMULATION 3 | <100 | 200 | 100 | 1,900 |
| FORMULATION 4 | <100 | 100 | 560,000 | 61,000 |
| FORMULATION 5 | 100 | <100 | <100 | 1,100 |

The data indicates that the reduced-sodium frankfurters containing the co-processed blend of autolyzed yeast and ammonium chloride do not support bacterial growth above that of the control containing sodium chloride.

EXAMPLE X

The following example gives the formula for a low sodium frankfurter utilizing the sodium chloride substitute system which has acceptable flavor and texture when prepared using the process outlined in Example IX.

| FRANKFURTER FORMULA | |
|---|---|
| | Percent of Emulsion by Weight |
| Lean beef (15% fat) | 36.42 |
| Pork jowls (68% fat) | 20.50 |
| Lean pork trim (15% fat) | 16.06 |
| Water-ice | 21.90 |
| Corn syrup solids | 1.45 |
| Dextrose | 0.73 |
| Frank seasoning | 0.33 |
| Liquid smoke | 0.09 |
| Garlic powder | 0.01 |
| Sodium erythorbate | 0.045 |
| Sodium nitrite | 0.01 |
| Sodium chloride | 0.91 |
| Potassium chloride | 0.65 |
| Co-processed autolyzed yeast and 32 percent potassium chloride | 0.75 |
| Co-processed autolyzed yeast and 20 percent ammonium chloride | 0.15 |

We claim:
1. A method of preparing a composition for imparting a low bitterness sodium chloride flavor, comprising the steps of:

mixing yeast, at least one exogenous enzyme, ammonium chloride, and a liquid to form a liquid mixture;

stirring said liquid mixture while maintaining an elevated temperature until said yeast is autolyzed, said ammonium chloride being present in an amount to provide by total dry weight of the liquid mixture about one part ammonium chloride to about 4 parts autolyzed yeast; and drying said liquid mixture to form a dry product having a low bitterness and an intense sodium chloride flavor to human taste.

2. The method of claim 1 wherein said liquid mixture further includes:

potassium chloride.

3. The method of claim 2 wherein said dry product comprises from 0.5 to 20 parts by weight potassium chloride to one part by weight of said yeast and ammonium chloride.

4. A dry product for imparting a low bitterness and an intense sodium chloride flavor to human taste prepared by the process steps of:

mixing yeast, at least one exogenous enzyme, ammonium chloride, and a liquid to form a liquid mixture;

stirring said liquid mixture while maintaining an elevated temperature until said yeast is autolyzed, said ammonium chloride being present in an amount to provide by total dry weight of the liquid mixture about one part ammonium chloride to about 4 parts autolyzed yeast; and drying said liquid mixture to form said dry product.

5. The product of claim 4 wherein said liquid mixture further includes:

potassium chloride.

6. The product of claim 5 wherein said dry product comprises from 0.5 to 20 parts by weight potassium chloride to one part by weight of said yeast and ammonium chloride.

* * * * *